(12) United States Patent
Woo et al.

(10) Patent No.: US 10,329,385 B2
(45) Date of Patent: *Jun. 25, 2019

(54) COMPOSITION FOR WINDOW FILM, FLEXIBLE WINDOW FILM FORMED THEREFROM, AND FLEXIBLE DISPLAY DEVICE COMPRISING SAME

(71) Applicants: SAMSUNG SDI CO., LTD., Yongin-si, Gyeonggi-do (KR); SAMSUNG ELECTRONICS CO., LTD., Suwon-si, Gyeonggi-do (KR)

(72) Inventors: Chang Soo Woo, Uiwang-si (KR); Kyoung Ku Kang, Uiwang-si (KR); Min Hye Kim, Uiwang-si (KR); Ji Sun Im, Uiwang-si (KR); Seung Woo Jang, Uiwang-si (KR); Dong Il Han, Uiwang-si (KR)

(73) Assignees: Samsung SDI Co., Ltd., Yongin-si (KR); Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/531,672

(22) PCT Filed: Nov. 13, 2015

(86) PCT No.: PCT/KR2015/012231
§ 371 (c)(1),
(2) Date: May 30, 2017

(87) PCT Pub. No.: WO2016/089021
PCT Pub. Date: Jun. 9, 2016

(65) Prior Publication Data
US 2018/0282484 A1    Oct. 4, 2018

(30) Foreign Application Priority Data
Dec. 3, 2014   (KR) .................. 10-2014-0172471

(51) Int. Cl.
| | | |
|---|---|---|
| C08G 77/04 | (2006.01) |
| C08G 77/00 | (2006.01) |
| C08G 77/14 | (2006.01) |
| C08G 77/388 | (2006.01) |
| C08G 77/42 | (2006.01) |
| B32B 7/12 | (2006.01) |
| B32B 27/28 | (2006.01) |
| C09D 183/06 | (2006.01) |
| C09D 183/08 | (2006.01) |
| C08G 77/26 | (2006.01) |

(52) U.S. Cl.
CPC .............. *C08G 77/80* (2013.01); *B32B 7/12* (2013.01); *B32B 27/283* (2013.01); *C08G 77/14* (2013.01); *C08G 77/388* (2013.01); *C08G 77/42* (2013.01); *C09D 183/06* (2013.01); *C09D 183/08* (2013.01); *B32B 2307/412* (2013.01); *B32B 2307/42* (2013.01); *B32B 2457/208* (2013.01); *C08G 77/26* (2013.01)

(58) Field of Classification Search
CPC ..................................................... B32B 27/283
USPC ......................................................... 428/447
See application file for complete search history.

(56) References Cited

U.S. PATENT DOCUMENTS

| | | |
|---|---|---|
| 5,191,045 A | 3/1993 | Funaki et al. |
| 6,048,910 A | 4/2000 | Furuya et al. |
| 6,440,569 B1 | 8/2002 | Kanamori et al. |
| 7,303,785 B2 * | 12/2007 | Ogihara ............... C09D 183/04 106/287.12 |
| 7,541,134 B2 | 6/2009 | Iwabuchi et al. |
| 9,811,192 B2 * | 11/2017 | Woo ...................... G06F 1/1652 |
| 2003/0020049 A1 | 1/2003 | Payne et al. |
| 2007/0298349 A1 * | 12/2007 | Zhang .................. C09D 183/04 430/270.1 |
| 2008/0058441 A1 | 3/2008 | Watanabe et al. |
| 2008/0280149 A1 | 11/2008 | Higuchi et al. |
| 2009/0269504 A1 | 10/2009 | Liao |
| 2010/0092895 A1 | 4/2010 | Zhang et al. |
| 2011/0230584 A1 | 9/2011 | Araki et al. |
| 2014/0154626 A1 | 6/2014 | Bujalski et al. |
| 2014/0179869 A1 | 6/2014 | Ko et al. |
| 2015/0093585 A1 | 4/2015 | Bae et al. |
| 2018/0282484 A1 | 10/2018 | Woo et al. |

FOREIGN PATENT DOCUMENTS

| | | |
|---|---|---|
| JP | 07-118563 | 5/1995 |
| JP | 2007-176542 A | 7/2007 |
| KR | 10-2008-0099160 A | 11/2008 |
| KR | 10-2009-0116751 A | 11/2009 |
| KR | 10-2010-0134689 A | 12/2010 |
| KR | 10-2012-0139616 A | 12/2012 |
| KR | 10-2014-0004568 A | 1/2014 |
| KR | 10-2014-0134147 A | 11/2014 |
| KR | 10-2016-0065411 A | 6/2016 |
| TW | 201033289 A1 | 9/2010 |
| WO | WO 2009/090867 A1 | 7/2009 |

OTHER PUBLICATIONS

International Search Report for corresponding PCT Application No. PCT/KR2015/012231, dated Feb. 24, 2016, with English Translation (6 pages).

(Continued)

*Primary Examiner* — Marc S Zimmer
(74) *Attorney, Agent, or Firm* — Lewis Roca Rothgerber Christie LLP

(57) ABSTRACT

Provided are a composition for a window film, a flexible window film formed therefrom, and a flexible display device comprising the same, wherein the composition for a window film, contains: (1) a siloxane resin comprising $(R_1SiO_{3/2})_x$ $(R_2SiO_{3/2})_y$ (wherein, $R_1$ is a cross-linkable functional group, $R_2$ is a UV absorbing functional group or a UV absorbing functional group-containing group, and $0<x<1$, $0<y<1$, $x+y=1$) and (2) an initiator.

12 Claims, 2 Drawing Sheets

(56) References Cited

OTHER PUBLICATIONS

Written Opinion for corresponding PCT Application No. PCT/KR2015/012231, dated Feb. 24, 2016 (4 pages).
Korean Office action in corresponding Korean Application No. 10-2014-0172471, Korean Office action dated May 22, 2017 (5 pgs.).
Office action in corresponding Korean patent application No. 10-2014-0172471, Korean Office action dated Jan. 17, 2018 (5 pgs.).
Taiwan Patent Office action dated May 24, 2016, issued in TW Application No. 104139529, 4 pages.
Machine translation of WO 2009/090867 into the English language.
U.S. Office Action dated Feb. 10, 2017, issued in U.S. Appl. No. 14/951,328 (7 pages).
U.S. Notice of Allowance dated Jul. 3, 2017, issued in U.S. Appl. No. 14/951,328 (13 pages).
International Search Report for corresponding PCT Application No. PCT/KR2015/013827, dated May 13, 2016, with English Translation (6 pages).
Written Opinion for corresponding PCT Application No. PCT/KR2015/013827, dated May 13, 2016 (6 pages).
U.S. Office Action dated Dec. 13, 2018, issued in U.S. Appl. No. 15/535,379 (10 pages).

* cited by examiner

【FIG. 1】
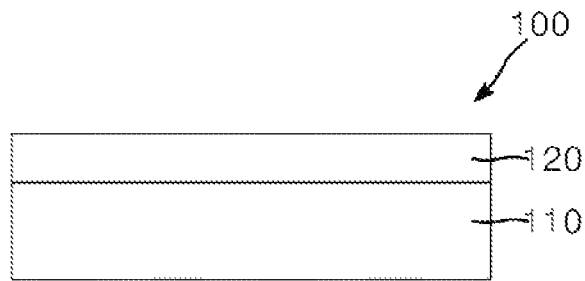
【FIG. 2】
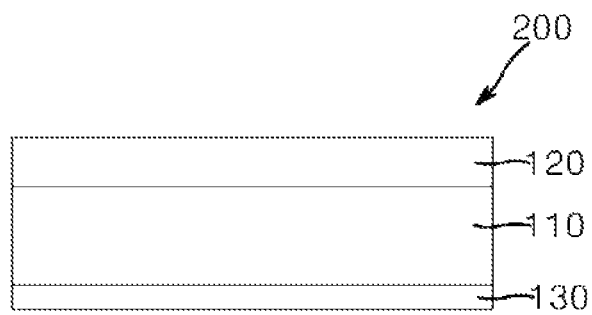
【FIG. 3】
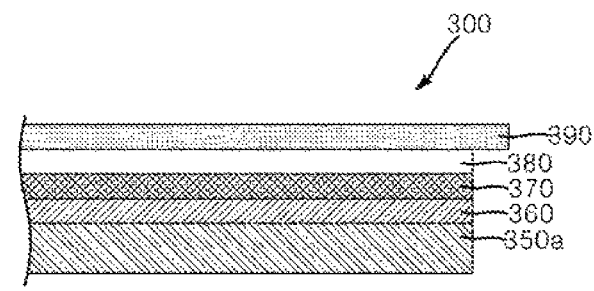

[FIG. 4]
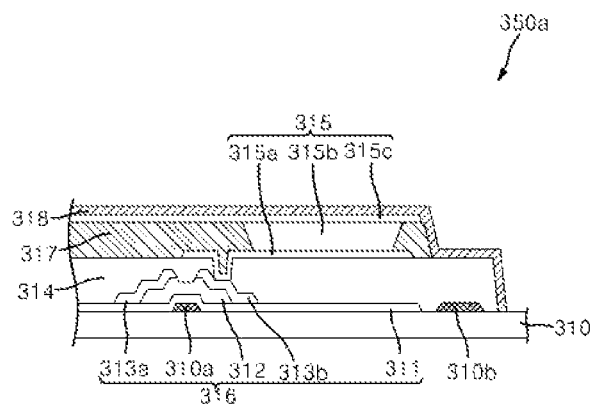
[FIG. 5]
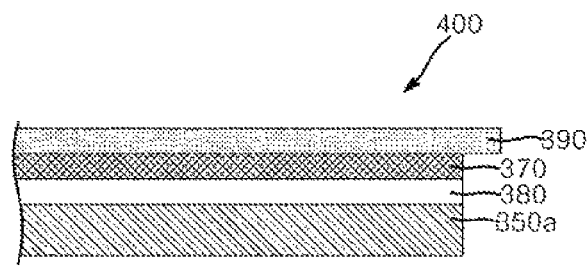
[FIG. 6]
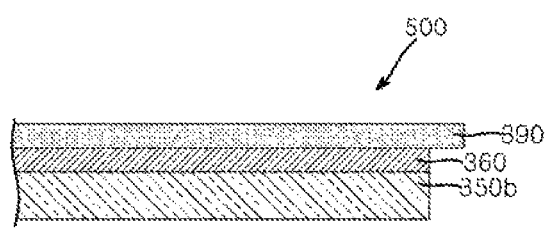

COMPOSITION FOR WINDOW FILM, FLEXIBLE WINDOW FILM FORMED THEREFROM, AND FLEXIBLE DISPLAY DEVICE COMPRISING SAME

CROSS-REFERENCE TO RELATED APPLICATIONS

This Application is a National Phase Patent Application and claims priority to and the benefit of International Application Number PCT/KR2015/012231, filed on Nov. 13, 2015, which claims priority to and the benefit of Korean Application No. 10-2014-0172471, filed on Dec. 3, 2014, the entire contents of each of which are incorporated herein by reference.

BACKGROUND

1. Field

The present invention relates to a composition for window films, a flexible window film produced therefrom, a flexible window film and a flexible display comprising the same.

2. Description of the Related Art

Recently, with the replacement of a glass substrate or a high hardness substrate with a film in a display, a flexible display capable of being folded or unfolded has been developed in the related art. The flexible display is thin and light, has high impact resistance, can be folded and unfolded, and thus can be manufactured in various shapes.

In such a flexible display, not only a substrate but also various elements are required to have flexibility. Particularly, since a window film is disposed at the outermost side of the display, it is necessary for the window film to have flexibility, high hardness and optical reliability.

The background technique of the present invention is disclosed in Japanese Unexamined Patent Publication No. 2007-176542.

SUMMARY

It is one aspect of the present invention to provide a composition for window films, which can realize a flexible window film having good properties in terms of hardness, flexibility and optical reliability such as light resistance.

It is another aspect of the present invention to provide a flexible window film, which has good properties in terms of hardness, flexibility and light resistance, and a flexible display including the same.

In accordance with one aspect of the present invention, a composition for window films includes a siloxane resin comprising a compound represented by Formula 1 and an initiator:

$(R^1SiO_{3/2})_x(R^2SiO_{3/2})_y$  <Formula 1>

(wherein $R^1$ and $R^2$ are the same as defined in the detailed description of the invention; and $0<x<1$, $0<y<1$, and $x+y=1$).

In accordance with another aspect of the present invention, a flexible window film includes: a base layer and a coating layer formed on one surface of the base layer, wherein the coating layer is formed of the composition for window films as set forth above.

In accordance with another aspect of the present invention, a flexible display includes the flexible window film as set forth above.

The present invention provides a composition for window films, which can realize a flexible window film having good properties in terms of hardness, flexibility and optical reliability such as light resistance.

The present invention provides a flexible window film, which has good properties in terms of hardness, flexibility and light resistance, and a flexible display including the same.

BRIEF DESCRIPTION OF THE DRAWINGS

FIG. 1 is a sectional view of a flexible window film according to one embodiment of the present invention.

FIG. 2 is a sectional view of a flexible window film according to another embodiment of the present invention.

FIG. 3 is a sectional view of a flexible display according to one embodiment of the present invention.

FIG. 4 is a sectional view of one embodiment of a display unit shown in FIG. 3.

FIG. 5 is a sectional view of a flexible display according to another embodiment of the present invention.

FIG. 6 is a sectional view of a flexible display according to a further embodiment of the present invention.

DETAILED DESCRIPTION

Embodiments of the present invention will be described in detail with reference to the accompanying drawings. It should be understood that the present invention is not limited to the following embodiments and may be embodied in different ways. In the drawings, portions irrelevant to the description will be omitted for clarity. Like components will be denoted by like reference numerals throughout the specification.

Herein, spatially relative terms such as "upper" and "lower" are defined with reference to the accompanying drawings. Thus, it will be understood that the term "upper surface" can be used interchangeably with the term "lower surface". In addition, when an element such as a layer or a film is referred to as being placed "on" another element, it can be directly placed on the other element, or intervening element(s) may be present. On the other hand, when an element is referred to as being placed "directly on" another element, there are no intervening element(s) therebetween.

Herein, the term "pencil hardness" is measured on a coating layer of a window film using a pencil hardness tester (Heidon) in accordance with JIS K5400. In measurement of pencil hardness, pencils of 6B to 9H (Mitsubishi Co., Ltd.) are used. Specifically, pencil hardness is measured under conditions of a pencil load of 1 kg on the coating layer, a scratch angle of 45°, and a scratch speed of 60 mm/min. When the coating layer has one or more scratches after being tested 5 times using a certain pencil, pencil hardness is measured again using another pencil having one-level lower pencil hardness than the previous pencil, and the maximum value of pencil hardness allowing no scratch to be observed all five times on the coating layer is taken as pencil hardness of the coating layer.

Herein, the term "radius of curvature" refers to a minimum radius of a jig causing no crack on a window film specimen when the window film specimen is wound around the jig for measuring a radius of curvature (CFT-200R, Coretech Co., Ltd.), kept wound for 5 seconds or more, unwound, and then observed with the naked eye to determine whether the specimen has cracks. Here, a radius of curvature in a compressive direction is measured when the specimen is wound around the jig such that a window coating layer of the window film contacts a surface of the jig, and a radius of curvature in a tensile direction is measured when the specimen is wound around the jig such that a base layer of the window film contacts the jig. Here, the window film specimen has a thickness of 50 μm to 300 μm.

Herein, "ΔY.I." refers to a difference (Y2−Y1) between a yellow index (Y1) measured on a window film under a D65 light source at 2° (angle between the window film and the light source) using a colorimeter (CM-3600D, Konica Minolta) and a yellow index (Y2) measured on the window film by the same method after irradiating the window film at a peak wavelength of 306 nm for 72 hours using a weather resistance tester (Xe-1, Q-SUN).

Herein, the term "(meth)acryl" refers to "acryl" and/or "methacryl".

Herein, unless otherwise stated, "substituted" means that at least one hydrogen atom in a functional group is substituted with a hydroxyl group, an unsubstituted $C_1$ to $C_{10}$ alkyl group, a $C_3$ to $C_{10}$ cycloalkyl group, a $C_1$ to $C_{10}$ alkoxy group, a $C_6$ to $C_{20}$ aryl group, a $C_7$ to $C_{20}$ arylalkyl group, a benzophenone group, a $C_6$ to $C_{20}$ aryl group substituted with a $C_1$ to $C_{10}$ alkyl group, or a $C_1$ to $C_{10}$ alkyl group substituted with a $C_1$ to $C_{10}$ alkoxy group.

Herein, the term "crosslinkable functional group" means a functional group allowing crosslinking reaction by heat and/or light. For example, the crosslinkable functional group means an epoxy group, an epoxy group-containing group, a glycidyl group, a glycidyl group-containing group, a glycidoxy group, a glycidoxy group-containing group, an oxetanyl group, an oxetanyl group-containing group, and the like. Specifically, the crosslinkable functional group means an epoxy group; a glycidyl group; a glycidoxy group; an oxetanyl group; an oxetanyloxy group; an epoxy group, a glycidyl group, a glycidoxy group, an epoxylated $C_5$ to $C_{20}$ cycloalkyl group, an epoxylated $C_1$ to $C_{10}$ alkyl group, an oxetanyl group or an oxetanyloxy group-containing $C_1$ to $C_{20}$ alkyl group; or an epoxy group, glycidyl group, a glycidoxy group, an epoxylated $C_5$ to $C_{20}$ cycloalkyl group, an epoxylated $C_1$ to $C_{10}$ alkyl group, or an oxetanyl group or oxetanyloxy group-containing $C_5$ to $C_{20}$ cycloalkyl group, and may be unsubstituted or substituted with another element.

Herein, the term "UV absorption functional group" means a functional group absorbing light at a wavelength of 400 nm or less, for example, 100 nm to 400 nm. Specifically, the UV absorption functional group includes an unsubstituted or substituted benzotriazole group, an unsubstituted or substituted benzophenone group, an unsubstituted or substituted hydroxybenzophenone group, an unsubstituted or substituted triazine group, an unsubstituted or substituted salicylate group, an unsubstituted or substituted cyanoacrylate group, an unsubstituted or substituted oxanilide group, an unsubstituted or substituted hydroxyphenyltriazine group, an unsubstituted or substituted hydroxyphenylbenzotriazole group, and an unsubstituted or substituted hydroxyphenylbenzophenone group, without being limited thereto.

Herein, the term "UV absorption functional group-containing group" means a group containing the UV absorption functional group.

Herein, the term "alkyleneoxy group" means an alkylene group having oxygen (O) at a terminal or inner structure thereof.

Herein, the term "halogen" means fluorine, chlorine, bromine, or iodine.

Hereinafter, a composition for window films according to one embodiment of the present invention will be described.

The composition for window films according to the embodiment includes a siloxane resin comprising a compound represented by Formula 1 and an initiator:

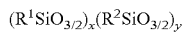  <Formula 1>

(wherein $R^1$ is a crosslinkable functional group; $R^2$ is a UV absorption functional group or a UV absorption functional group-containing group; and $0<x<1$, $0<y<1$, and $x+y=1$).

With the siloxane resin comprising the compound represented by Formula 1, the composition for window films according to the embodiment can improve hardness and optical reliability, such as light resistance, of a window film formed of the same. In addition, the siloxane resin comprising the compound represented by Formula 1 is prepared through adjustment of the content of a silicon monomer for each of $(R^1SiO_{3/2})$ and $(R^2SiO_{3/2})$, whereby the composition for window films according to this embodiment permits easy adjustment of hardness and optical reliability of the window film. Specifically, $0.20<x<0.999$ and $0.001<y<0.80$, more specifically $0.20<x<0.99$ and $0.01<y<0.80$, still more specifically $0.80<x<0.99$ and $0.01$: $y<0.20$. Within this range, the siloxane resin can improve hardness and optical reliability of the window film.

In Formula 1, $R^1$ can provide crosslinkability to the composition for window films. Specifically, $R^1$ may be a (3,4-epoxycyclohexyl)methyl group, a (3,4-epoxycyclohexyl)ethyl group, a (3,4-epoxycyclohexyl)propyl group, a 3-glycidoxypropyl group, a 3-oxetanylmethyl group, a 3-oxetanylethyl group, a 3-oxetanylpropyl group, a 3-oxetanyloxy group, or the like.

In Formula 1, $R^2$ can absorb UV light. Specifically, $R^2$ may be an unsubstituted or substituted hydroxybenzophenone group, an unsubstituted or substituted hydroxyphenyltriazine group, or a compound represented by Formula 2:

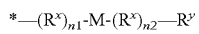  <Formula 2>

(wherein * is a linking site with respect to Si;
$R^x$ is an unsubstituted or substituted $C_1$ to $C_{20}$ alkylene group, an unsubstituted or substituted $C_1$ to $C_{20}$ alkyleneoxy group, an unsubstituted or substituted $C_1$ to $C_{20}$ alkylene group having a urethane group at a terminal or inner structure thereof, an unsubstituted or substituted $C_1$ to $C_{20}$ alkyleneoxy group having a urethane group at a terminal or inner structure thereof, an unsubstituted or substituted $C_6$ to $C_{20}$ arylene group, or a combination thereof;
n1 and n2 are each independently 0 or 1;
M is a single bond, oxygen (O), sulfur (S), NR (R being hydrogen or a $C_1$ to $C_{10}$ alkyl group), —CONH—, —OCONH—, —C=O—, or —C=S—; and
$R^y$ is an unsubstituted or substituted benzotriazol group, an unsubstituted or substituted benzophenone group, an unsubstituted or substituted hydroxybenzophenone group, an unsubstituted or substituted triazine group, an unsubstituted or substituted salicylate group, an unsubstituted or substituted cyanoacrylate group, an unsubstituted or substituted oxanilide group, an unsubstituted or substituted hydroxyphenyltriazine group, an unsubstituted or substituted hydroxyphenylbenzotriazol group, or an unsubstituted or substituted hydroxyphenylbenzophenone group).

Specifically, in Formula 2, $R^x$ is an unsubstituted or substituted $C_1$ to $C_{20}$ alkylene group or an unsubstituted or substituted $C_1$ to $C_{20}$ alkyleneoxy group; M is oxygen (O) or —OCONH—; and —$R^y$ is an unsubstituted or substituted hydroxybenzophenone group or an unsubstituted or substituted hydroxyphenyltriazine group. More specifically, in Formula 2, $R^y$ is a 2-hydroxybenzophenone group, a 2,4-dihydroxybenzophenone group, a 2-hydroxybenzophenone group, a 2-hydroxy-4-methoxybenzophenone group, a 2-hydroxy-4-methoxy-4'-methylbenzophenone group, a 2,2'-dihydroxy-4-methoxybenzophenone group, a 2,4,4'-trihydroxybenzophenone group, a 2,2',4,4'-tetrahydroxybenzophenone group, a 2,3,4,4'-tetrahydroxybenzophenone group, a 2,3',4,4'-tetrahydroxybenzophenone group, a 2,2'-dihydroxy-4,4'-dimethoxybenzophenone group, or a compound represented by Formula 2-1:

<Formula 2-1>

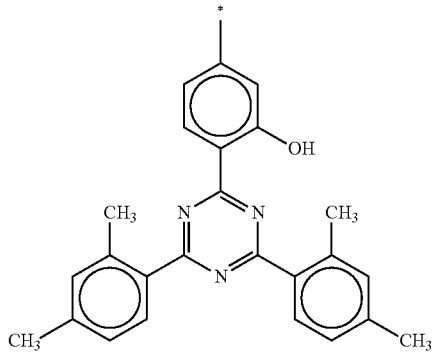

(wherein, * is a linking site).

Specifically, the siloxane resin comprising the compound represented by Formula 1 may include at least one of Formulae 1-1 to 1-12, without being limited thereto:

| | |
|---|---|
| $(EcSiO_{3/2})_x(RaSiO_{3/2})_y$ | <Formula 1-1> |
| $(EcSiO_{3/2})_x(RbSiO_{3/2})_y$ | <Formula 1-2> |
| $(EcSiO_{3/2})_x(RcSiO_{3/2})_y$ | <Formula 1-3> |
| $(EcSiO_{3/2})_x(RdSiO_{3/2})_y$ | <Formula 1-4> |
| $(GpSiO_{3/2})_x(RaSiO_{3/2})_y$ | <Formula 1-5> |
| $(GpSiO_{3/2})_x(RbSiO_{3/2})_y$ | <Formula 1-6> |
| $(GpSiO_{3/2})_x(RcSiO_{3/2})_y$ | <Formula 1-7> |
| $(GpSiO_{3/2})_x(RdSiO_{3/2})_y$ | <Formula 1-8> |
| $(OpSiO_{3/2})_x(RaSiO_{3/2})_y$ | <Formula 1-9> |
| $(OpSiO_{3/2})_x(RbSiO_{3/2})_y$ | <Formula 1-10> |
| $(OpSiO_{3/2})_x(RcSiO_{3/2})_y$ | <Formula 1-11> |
| $(OpSiO_{3/2})_x(RdSiO_{3/2})_y$ | <Formula 1-12> |

(wherein Ec is a (3,4-epoxycyclohexyl)ethyl group, Gp is a 3-glycidoxypropyl group, Op is a 3-oxetanylpropyl group, and Ra is a compound represented by Formula i, Rb is a compound represented by Formula ii, Rc is a compound represented by Formula iii, and Rd is a compound represented by Formula iv:

<Formula i>

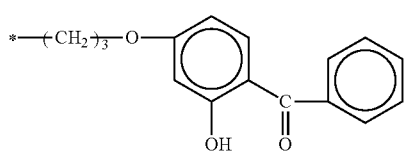

<Formula ii>

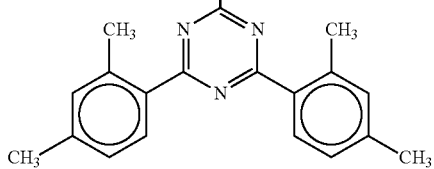

<Formula iii>

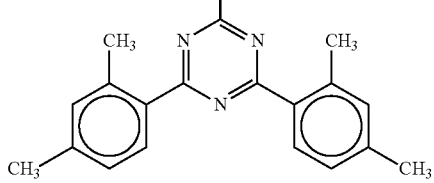

<Formula iv>

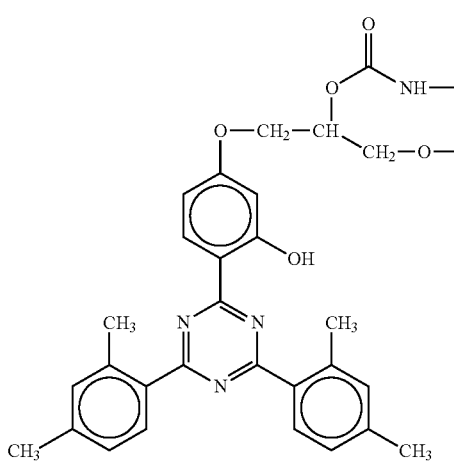

(wherein * is a linking site), $0<x<1$, $0<y<1$, and $x+y=1$).

The siloxane resin comprising the compound represented by Formula 1 may have a weight average molecular weight of 4,000 g/mol to 100,000 g/mol, specifically 4,500 g/mol to 10,000 g/mol. Within this range, the siloxane resin can be easily produced and can exhibit good properties in terms of hardness and flexibility. The siloxane resin comprising the compound represented by Formula 1 may have a polydispersion index (PDI) of 1.0 to 3.0, specifically 1.5 to 2.5.

Within this range, the siloxane resin can provide good coatability and stable coating properties to the composition for window films. The siloxane resin comprising the compound represented by Formula 1 may have an epoxy equivalent weight of 0.1 mol/100 g to 1.0 mol/100 g, specifically 0.3 mol/100 g to 0.7 mol/100 g. Within this range, the siloxane resin can provide stable coating properties to the window film.

The initiator can cure the crosslinkable functional group of the siloxane resin comprising the compound represented by Formula 1. The initiator may include at least one of a photo-cationic polymerization initiator and a photo-radical initiator. These initiators may be used alone or as a mixture thereof.

As the photo-cationic polymerization initiator, any typical photo-cationic polymerization initiator known to those skilled in the art may be used. Specifically, the photo-cationic polymerization initiator may include an onium salt containing a cation and an anion. Examples of the cation may include: diaryliodonium such as diphenyliodonium, 4-methoxydiphenyliodonium, bis(4-methylphenyl)iodonium, bis(4-tert-butylphenyl)iodonium, bis(dodecylphenyl)iodonium, and (4-methylphenyl)[(4-(2-methylpropyl)phenyl)iodonium]; triarylsulfonium such as triphenylsulfonium and diphenyl-4-thiophenoxyphenylsulfonium; bis[4-(diphenylsulfonio)phenyl]sulfide, and the like. Specifically, examples of the anion may include hexafluorophosphate ($PF_6^-$), tetrafluoroborate ($BF_4^-$), hexafluoroantimonate ($SbF_6^-$), hexafluoroarsenate ($AsF_6^-$), hexachloroantimonate ($SbCl_6^-$), and the like.

As the photo-radical initiator, any photo-radical initiator known to those skilled in the art may be used. Specifically, the photo-radical initiator may include at least one of thioxanthone, phosphorus, triazine, acetophenone, benzophenone, benzoin, and oxime photo-radical initiator.

The initiator may be present in an amount of 0.01 parts by weight to 20 parts by weight, specifically 1 part by weight to 10 parts by weight, relative to 100 parts by weight of the siloxane resin comprising the compound represented by Formula 1. Within this range, the siloxane resin can be sufficiently cured without deterioration in transparency of the window film due to the remaining initiator.

The composition for window films according to this embodiment may further include nanoparticles.

The nanoparticles can further improve hardness of the window film. The nanoparticles may include at least one of silica, aluminum oxide, zirconium oxide, and titanium oxide, without being limited thereto. The nanoparticles may also be subjected to surface treatment with a silicone compound for mixing with the siloxane resin. The nanoparticles are not limited to a particular shape or size. Specifically, the nanoparticles may include spherical, flake, or amorphous particles. The nanoparticles may have an average particle size of 1 nm to 200 nm, specifically 10 nm to 50 nm. Within this range, the nanoparticles can increase hardness of the window film without affecting surface roughness and transparency thereof. The nanoparticles may be present in an amount of 0.1 parts by weight to 60 parts by weight, specifically 10 parts by weight to 50 parts by weight, relative to 100 parts by weight of the siloxane resin comprising the compound represented by Formula 1. Within this range, the nanoparticles can increase hardness of the window film without affecting surface roughness and transparency thereof.

The composition for window films according to this embodiment may further include additives.

The additives can provide additional functions to the window film. The additives may be any additives commonly used for window films in the related art. Specifically, the additives may include at least one of a UV absorbent, a reaction inhibitor, an adhesion promoter, a thixotropic agent, a conductivity imparting agent, a color adjusting agent, a stabilizer, an antistatic agent, an antioxidant, and a leveling agent, without being limited thereto. The reaction inhibitor may include ethynylcyclohexane, the adhesion promoter may be an epoxy or alkoxysilane group-containing silane compound, and the thixotropic agent may be free silica. The conductivity imparting agent may include metal powder such as silver powder, copper powder, aluminum powder, and the like, and the color adjusting agent may include pigments, dyes, and the like. The UV absorbent can improve light resistance of the window film. The UV absorbent may be any typical absorbent known to those skilled in the art. Specifically, the UV absorbent may include at least one of triazine, benzimidazole, benzophenone, benzotriazole, and hydroxyphenyltriazine UV absorbents, without being limited thereto. The additives may be present in an amount of 0.01 parts by weight to 5 parts by weight, specifically 0.1 parts by weight to 2.5 parts by weight, relative to 100 parts by weight of the siloxane resin comprising the compound represented by Formula 1. Within this range, the additives can improve hardness and flexibility of the window film while realizing effects thereof.

The composition for window films according to this embodiment may further include a solvent to improve coatability, wettability or processability. The solvent may include methylethylketone, methylisobutylketone, and propylene glycol monomethyletheracetate, without being limited thereto.

The composition for window films according to this embodiment may have a viscosity of 50 cP to 2,000 cP at 25° C. Within this range, the composition allows easy formation of the window film.

Next, a method of preparing the siloxane resin comprising the compound represented by Formula 1 will be described in detail.

The siloxane resin comprising the compound represented by Formula 1 may be prepared through hydrolysis and condensation of a monomer mixture including a first silicon monomer and a second silicon monomer. In the monomer mixture, the first silicon monomer may be present in an amount of 20 mol % to 99.9 mol %, specifically 20 mol % to 99 mol %, more specifically 80 mol % to 99 mol %. Within this range, the first silicon monomer can improve hardness and optical reliability of the window film. In the monomer mixture, the second silicon monomer may be present in an amount of 0.1 mol % to 80 mol %, specifically 1 mol % to 80 mol %, more specifically 1 mol % to 20 mol %. Within this range, the second silicon monomer can improve hardness and optical reliability of the window film.

The first silicon monomer may include a silane compound represented by Formula 3. These may be used alone or in combination thereof.

<Formula 3>

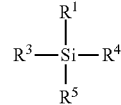

(wherein $R^1$ is the same as defined in Formula 1, and $R^3$, $R^4$ and $R^5$ are each independently a halogen, a hydroxyl group or a $C_1$ to $C_{10}$ alkoxy group).

Specifically, the first silicon monomer may include at least one selected from 2-(3,4-epoxycyclohexyl)ethyltriethoxysilane, 2-(3,4-epoxycyclohexyl)ethyltrimethoxysilane, 3-glycidoxypropyltriethoxysilane, 3-oxetanylmethyltrimethoxysilane, 3-oxetanylethyltrimethoxysilane, 3-oxetanylpropyltrimethoxysilane, and 3-oxetanyloxytrimethoxysilane, without being limited thereto.

The second silicon monomer may include a silane compound represented by Formula 4. These may be used alone or in combination thereof.

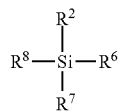

<Formula 4>

(wherein $R^2$ is the same as defined in Formula 1, and $R^6$, $R^7$ and $R^8$ are each independently a halogen, a hydroxyl group or a $C_1$ to $C_{10}$ alkoxy group).

In one embodiment, the second silicon monomer may be prepared through reaction of benzophenone having two or more hydroxyl groups with alkoxysilane. Specifically, the benzophenone having two or more hydroxyl groups may be 2,2'-dihydroxybenzophenone, 2,4-dihydroxybenzophenone, 2,2'-dihydroxy-4-methoxybenzophenone, 2,2'-dihydroxy-4-methoxy-4'-methylbenzophenone, 2,2'-dihydroxy-4-methoxybenzophenone, 2,4,4'-trihydroxybenzophenone, 2,2',4,4'-tetrahydroxybenzophenone, 2,3,4,4'-tetrahydroxybenzophenone, 2,3',4,4'-tetrahydroxybenzophenone, or 2,2'-dihydroxy-4,4'-dimethoxybenzophenone. The alkoxysilane may include an alkoxysilane compound having one to three $C_1$ to $C_5$ alkoxy groups. The benzophenone having two or more hydroxyl groups and the alkoxysilane may be reacted in a mole ratio of 1:1 to 1:1.5. A platinum catalyst may be used in order to improve reaction efficiency.

In another embodiment, the second silicon monomer may be prepared by reacting a UV absorbent known to those skilled in the art with an alkoxysilane compound having a functional group capable of reacting with the UV absorbent. Specifically, the UV absorbent may include hydroxyphenyltriazine UV absorbents such as Tinuvin 400, Tinuvin 405, Tinuvin 460, and Tinuvin 479; hydroxyphenyl benzotriazol UV absorbents such as Tinuvin 99, Tinuvin 99-2, Tinuvin 171, Tinuvin 328, Tinuvin 384-2, Tinuvin 900, Tinuvin 928, Tinuvin 1130, Tinuvin 5050, Tinuvin 5060, Tinuvin 5151, and Tinuvin P; and benzophenone UV absorbents such as Chimassorb 81 and Chimassorb 90, without being limited thereto. Specifically, the alkoxysilane compound may include trialkoxysilane having an isocyanate group. More specifically, the trialkoxysilane may contain an isocyanate group-containing $C_1$ to $C_{10}$ alkyl group and an isocyanate group-containing $C_1$ to $C_{10}$ alkoxy group. For example, the trialkoxysilane may be 3-(triethoxysilyl)propyl isocyanate. Reaction between the UV absorbent and trialkoxysilane may be performed in a solvent at 20° C. to 80° C. for 1 hour to 12 hours. The solvent may be an organic solvent such as tetrahydrofuran. In reaction of the UV absorbent with trialkoxysilane, a catalyst may be used in order to improve reaction yield and may include a tin-based catalyst such as dibutyltin dilaurate.

In another embodiment, the second silicon monomer may be obtained from commercially available products. For example, the second silicon monomer may include 2-hydroxy-4-(3-triethoxysilylpropoxy)diphenylketone, without being limited thereto.

Hydrolysis and condensation of the monomer mixture may be performed by a typical method for preparation of a siloxane resin. Hydrolysis may include mixing the first silicon monomer with the second silicon monomer, and reacting the mixture in a mixture of water and at least one of an acid and a base. Specifically, the acid may be a strong acid such as HCl and $HNO_3$ and the base may be a strong base such as NaOH and KOH. Hydrolysis may be performed at 20° C. to 100° C. for 10 minutes to 7 hours. Under these conditions, hydrolysis efficiency of the first silicon monomer and the second silicon monomer can be improved. Condensation may be performed at 20° C. to 100° C. for 10 minutes to 12 hours under the same conditions as hydrolysis. Under these conditions, hydrolysis efficiency of the first silicon monomer and the second silicon monomer can be improved. A platinum catalyst may be further used in order to improve efficiency in hydrolysis and condensation. The platinum catalyst may include a vinylalkylsilane platinum complex including a Karstedt catalyst, platinum black, chloroplatinic acid, a chloroplatinic acid-olefin complex, a chloroplatinic acid-alcohol complex, or a mixture thereof.

Next, a composition for window films according to another embodiment of the invention will be described.

The composition for window films according to another embodiment may include a siloxane resin comprising a compound represented by Formula 1, an initiator, and a crosslinking agent. The crosslinking agent can improve hardness of a window film by increasing the crosslinking degree thereof. The composition for window films according to this embodiment is substantially the same as the composition for window films according to the above embodiment except for the crosslinking agent. Thus, the following description will focus on the crosslinking agent.

The crosslinking agent may contain a crosslinkable functional group to improve hardness of the window film. The crosslinking agent may include at least one of a non-cyclic aliphatic hydrocarbon group, a cyclic aliphatic hydrocarbon group, an aromatic hydrocarbon group, a hydrogenated aromatic hydrocarbon group, and an oxetane group to improve flexibility of the window film.

Specifically, the crosslinking agent may include at least one of a non-cyclic aliphatic epoxy monomer, a cyclic aliphatic epoxy monomer, an aromatic epoxy monomer, a hydrogenated aromatic epoxy monomer, and an oxetane monomer. The crosslinking agents may be used alone or as a mixture thereof.

The non-cyclic aliphatic epoxy monomer may include 1,4-butanediol diglycidyl ether, 1,6-hexanediol diglycidyl ether, neopentylglycol diglycidyl ether, trimethylolpropane triglycidyl ether, polyethyleneglycol diglycidyl ether, glycerin triglycidyl ether, and polypropylene glycol diglycidyl ether; polyglycidyl ethers of polyetherpolyol obtained by adding one type or more of alkylene oxide to aliphatic polyhydric alcohols, such as ethylene glycol, propylene glycol, glycerin, and the like; diglycidyl esters of aliphatic long-chain dibasic acids; monoglycidyl ethers of higher aliphatic alcohol; glycidyl ethers of higher fatty acid; epoxylated soybean oil; epoxy stearic acid butyl; epoxy stearic acid octyl; epoxylated linseed oil; epoxylated polybutadiene.

The cyclic aliphatic epoxy monomer is a compound having at least one epoxy group in an alicyclic group. Specifically, the cyclic aliphatic epoxy monomer may include alicyclic epoxy carboxylate and alicyclic epoxy (meth)acrylate. More specifically, the cyclic aliphatic epoxy monomer may include 3,4-epoxycyclohexyl)methyl-3',4'-epoxycyclohexanecarboxylate, diglycidyl 1,2-cyclohexanedicarboxylate, 2-(3,4-epoxycyclohexyl-5,5-spiro-3,4-epoxy)cyclohexane-meta-dioxane, bis(3,4-epoxycyclohexylmethyl)adipate, bis(3,4-epoxy-6-methylcyclohexylmethyl)adipate, 3,4-epoxy-6-methylcyclohexylmethyl-3',4'-epoxy-6'-methylcyclohexanecarboxylate, ε-caprolactone modified 3,4-epoxycyclohexylmethyl-3',4'-epoxycyclohexanecarboxylate, trimethylcaprolactone modified 3,4-epoxycyclohexylmethyl-3',4'-epoxy-cyclohexanecarboxylate, β-methyl-δ-valerolactone modified 3,4-epoxycyclohexylmethyl-3',4'-epoxycyclohexanecarboxylate, 1,4-cyclohexanedimethanol bis(3,4-epoxycyclohexanecarboxylate, ethylene glycol di(3,4-epoxycyclohexylmethyl)ether, ethylenebis(3,4-epoxycyclohexanecarboxylate), 3,4-epoxycyclohexylmethyl(meth)acrylate, 4-vinylcyclohexen dioxide, vinylcyclohexene monoxide, and the like.

Examples of the aromatic epoxy monomer may include bisphenol type epoxy resins such as diglycidyl ether of bisphenol A, diglycidyl ether of bisphenol F, and diglycidyl ether of bisphenol S; novolac type epoxy resins such as a phenol novolac epoxy resin, a cresol novolac epoxy resins, and a hydroxybenzaldehyde phenol novolac epoxy resin; and polyfunctional epoxy resins such as glycidyl ether of tetrahydroxyphenyl methane, glycidyl ether of tetrahydroxybenzophenone, and epoxylated polyvinyl phenol.

The hydrogenated aromatic epoxy monomer means a monomer obtained by selective hydrogenation of an aromatic epoxy monomer in the presence of a catalyst under pressure. The aromatic epoxy monomer for the hydrogenated aromatic epoxy monomer may include the aromatic epoxy monomer described above.

The oxetane monomer may include at least one selected from among 3-methyloxetane, 2-methyloxetane, 2-ethylhexyloxetane, 3-oxetanol, 2-methyleneoxetane, 3,3-oxetanedimethanethiol, 4-(3-methyloxetan-3-yl)benzonitrile, N-(2,2-dimethylpropyl)-3-methyl-3-oxetanmethaneamine, N-(1,2-dimethylbutyl)-3-methyl-3-oxetanmethaneamine, (3-ethyloxetan-3-yl)methyl(meth)acrylate, 4-[(3-ethyloxetan-3-yl)methoxy]butan-1-ol, 3-ethyl-3-hydroxymethyloxetane, xylenebisoxetane, and 3-[ethyl-3[(3-ethyloxetane-3-yl)methoxy]methyl]oxetane, without being limited thereto.

The crosslinking agent may be present in an amount of 0.1 parts by weight to 50 parts by weight, specifically 1 part by weight to 30 parts by weight, more specifically 5 parts by weight to 15 parts by weight, relative to 100 parts by weight of the siloxane resin comprising the compound represented by Formula 1. Within this range, the window film can exhibit high flexibility and hardness.

The composition for window films according to this embodiment may also further include at least one of the nanoparticles and the additives described above.

Next, a flexible window film according to one embodiment will be described with reference to FIG. 1. FIG. 1 is a sectional view of a flexible window film according to one embodiment of the invention.

Referring to FIG. 1, a flexible window film 100 according to one embodiment of the invention may include a base layer 110 and a coating layer 120, in which the coating layer 120 may be formed of the composition for window films according to the embodiments of the invention.

The base layer 110 can improve mechanical strength of the flexible window film 100 by supporting the coating layer 120 of the flexible window film 100. The base layer 110 may be attached to a display unit, a touchscreen panel or a polarizing plate via an adhesive layer or the like.

The base layer 110 may be formed of an optically transparent flexible resin. For example, the resin may include polyester resins including polyethylene terephthalate, polyethylene naphthalate, polybutylene terephthalate, polybutylene naphthalate, and the like, polyimide resins, polystyrene resins, poly(meth)acrylate resins including poly(methyl methacrylate), and the like. These resins may be used alone or as a mixture thereof. The base layer 110 may have a thickness of 10 μm to 200 μm, specifically 20 μm to 150 μm, more specifically 50 μm to 100 μm. Within this range, the base layer can be used in the flexible window film.

The coating layer 120 may be formed on the base layer 110 to protect the base layer 110, the display unit, the touchscreen panel or the polarizing plate, and has high flexibility and high hardness to be used for a flexible display. The coating layer 120 may have a thickness of 5 μm to 100 μm, specifically 10 μm to 80 μm. Within this range, the coating layer can be used in the flexible window film.

Although not shown in FIG. 1, functional surface layers such as an anti-reflection layer, an anti-glare layer, and a hard coating layer may be formed on the other surface of the coating layer 120 to provide additional functions. In addition, although not shown in FIG. 1, the coating layer 120 may be further formed on the other surface of the base layer 110.

The flexible window film 100 is optically transparent and may be used in a transparent display. Specifically, the flexible window film 100 may have a transmittance of 88% or more, specifically 88% to 100%, in the visible range, specifically in a wavelength region of 400 nm to 800 nm. Within this range, the flexible window film can be used as a window film.

The flexible window film 100 may have a pencil hardness of 7H or more, a radius of curvature of 5.0 mm or less, and ΔY.I. of 5.0 or less. Within this range, the flexible window film can exhibit good properties in terms of hardness, flexibility and light resistance to be used as a window film. Specifically, the flexible window film 100 may have a pencil hardness of 7H to 9H, a radius of curvature of 0.1 mm to 5.0 mm, and ΔY.I. of 0.1 to 5.0.

The flexible window film 100 may have a thickness of 50 μm to 300 μm. Within this range, the flexible window film can be used as a window film.

The flexible window film 100 may be formed by coating and curing the composition for window films according to the embodiments on the base layer 110.

A method of coating the composition for window films onto the base layer 110 is not particularly limited. For example, the composition for window films may be coated onto the base layer by bar coating, spin coating, dip coating, roll coating, flow coating, or die coating. The composition for window films may be coated to a thickness of 5 μm to 100 μm on the base layer 110. Within this thickness range, a desired coating layer can be secured while providing good hardness, flexibility and reliability.

Curing is performed to form the coating layer by curing the composition for window films, and may include at least one of photo curing and heat curing. Photo curing may include irradiating light at a dose of 10 mJ/cm$^2$ to 1,000 mJ/cm$^2$ at a wavelength of 400 nm or less. Heat curing may be performed at a temperature of 40° C. to 200° C. for 1 hour to 30 hours. Under these conditions, the composition for window films can be sufficiently cured. For example, heat curing may be performed after photo curing in order to achieve higher hardness of the coating layer.

Before curing the composition for window films coated onto the base layer 110, the method may further include drying the composition for window films. When curing is performed after drying, it is possible to prevent increase in surface roughness of the coating layer due to photo curing or heat curing for a long period of time. Drying may be performed at 40° C. to 200° C. for 1 minute to 30 hours, without being limited thereto.

Next, a flexible window film according to another embodiment will be described with reference to FIG. 2. FIG. 2 is a sectional view of a flexible window film according to another embodiment of the invention.

Referring to FIG. 2, a flexible window film 200 according to another embodiment of the invention may include a base layer 110, a coating layer 120 formed on one surface of the base layer 110, and an adhesive layer 130 formed on the other surface of the base layer 110, wherein the coating layer 120 may be formed of the composition for window films according to the embodiments of the present invention.

The adhesive layer 130 formed on the other surface of the base layer 110 can facilitate adhesion between the flexible window film and a touchscreen panel, a polarizing plate or a display unit. The flexible window film according to this embodiment is substantially the same as the flexible window film according to the above embodiment excluding the adhesive layer. Thus, the following description will be given of the adhesive layer alone.

The adhesive layer 130 attaches a polarizing plate, a touchscreen panel, or a display unit to the flexible window film 200 to be disposed under the flexible window film 200, and may be formed of an adhesive composition for the adhesive layer. Specifically, the adhesive layer 130 may be formed of an adhesive composition comprising an adhesive resin such as a (meth)acrylic resin, a urethane resin, a silicone resin, and an epoxy resin, a curing agent, a photoinitiator, and a silane coupling agent.

The (meth)acrylic resin is a (meth)acrylic copolymer having an alkyl group, a hydroxyl group, an aromatic group, a carboxylic acid group, an alicyclic group, a hetero-alicyclic group, and the like, and may include a typical (meth)acrylic copolymer. Specifically, the (meth)acrylic resin may be formed of a monomer mixture including at least one of a (meth)acrylic monomer containing a $C_1$ to $C_{10}$ unsubstituted alkyl group, a (meth)acrylic monomer containing a $C_1$ to $C_{10}$ alkyl group having at least one hydroxyl group, a (meth)acrylic monomer containing a $C_6$ to $C_{20}$ aromatic group, a (meth)acrylic monomer containing a carboxylic acid group, a (meth)acrylic monomer containing a $C_3$ to $C_{20}$ alicyclic group, and a (meth)acrylic monomer containing a $C_3$ to $C_{10}$ hetero-alicyclic group having at least one of nitrogen (N), oxygen (O), and sulfur (S).

The curing agent is a polyfunctional (meth)acrylate and may include a bifunctional (meth)acrylate such as hexanediol diacrylate; a trifunctional (meth)acrylate such as trimethylolpropane tri(meth)acrylate; a tetra-functional (meth)acrylate such as pentaerythritol tetra(meth)acrylate; a penta-functional (meth)acrylate such as dipentaerythritol penta(meth)acrylate; and a hexa-functional (meth)acrylate such as dipentaerythritol hexa(meth)acrylate, without being limited thereto.

The photoinitiator is a typical photoinitiator and may include the photo-radical initiator described above.

The silane coupling agent may include an epoxy group-containing silane coupling agent such as 3-glycidoxypropyltrimethoxysialne.

The adhesive composition may include 100 parts by weight of the (meth)acrylic resin, 0.1 parts by weight to 30 parts by weight of the curing agent, 0.1 parts by weight to 10 parts by weight of the photoinitiator, and 0.1 parts by weight to 20 parts by weight of the silane coupling agent. With this composition, the adhesive layer formed of the adhesive composition allows the flexible window film to be sufficiently attached to the display unit, the touchscreen panel, or the polarizing plate.

The adhesive layer 130 may have a thickness of 10 µm to 100 µm. Within this range, the adhesive layer can sufficiently attach the flexible window film to an optical device such as a polarizing plate.

Next, a flexible display according to one embodiment will be described with reference to FIG. 3 and FIG. 4. FIG. 3 is a sectional view of a flexible display according to one embodiment of the present invention and FIG. 4 is a sectional view of one embodiment of a display unit shown in FIG. 3.

Referring to FIG. 3, a flexible display 300 according to one embodiment of the invention includes a display unit 350a, an adhesive layer 360, a polarizing plate 370, a touchscreen panel 380, and a flexible window film 390, which may include the flexible window film according to the embodiments of the invention.

The display unit 350a serves to drive the flexible display 300 and may include a substrate and an optical device formed on the substrate and including an OLED, an LED or an LCD device. FIG. 4 is a sectional view of one embodiment of the display unit shown in FIG. 3. Referring to FIG. 4, a display unit 350a includes a lower substrate 310, a thin film transistor 316, an organic light emitting diode 315, a flattening layer 314, a protective layer 318, and an insulating layer 317.

The lower substrate 310 supports the display unit 350a, and the thin film transistor 316 and the organic light emitting diode 315 may be formed on the lower substrate 310. The lower substrate 310 may be formed with a flexible printed circuit board (FPCB) for driving the touchscreen panel 380. The flexible printed circuit board may further include a timing controller, a power source, and the like in order to drive an array of organic light emitting diodes.

The lower substrate 310 may include a substrate formed of a flexible resin. Specifically, the lower substrate 310 may include a flexible substrate such as a silicone substrate, a polyimide substrate, a polycarbonate substrate, and a polyacrylate substrate, without being limited thereto.

In a display area of the lower substrate 310, plural pixel domains are defined by plural driving wires (not shown) and plural sensor wires (not shown) intersecting each other and each of the pixel domains may be formed with an array of organic light emitting diodes, each of which includes the thin film transistor 316 and the organic light emitting diode 315 connected to the thin film transistor 316. In a non-display area of the lower substrate, a gate driver applying electric signals to the driving wires may be formed in the form of a gate-in panel. The gate-in panel circuit may be formed at one or both sides of the display area.

The thin film transistor 316 controls electric current flowing through a semiconductor by application of an electric field perpendicular to the electric current and may be formed on the lower substrate 310. The thin film transistor 316 may include a gate electrode 310a, a gate insulation layer 311, a semiconductor layer 312, a source electrode 313a, and a drain electrode 313b. The thin film transistor 316 may be an oxide thin film transistor which uses an oxide such as indium gallium zinc oxide (IGZO), ZnO, or TiO as the semiconductor layer, an organic thin film transistor which uses an organic material as the semiconductor layer, an amorphous silicon thin film transistor which uses amorphous silicon as the semiconductor layer, or a polycrystalline silicon thin film transistor which uses polycrystalline silicon as the semiconductor layer.

The flattening layer 314 covers the thin film transistor 316 and a circuit section 310b to flatten upper surfaces of the thin film transistor 316 and the circuit section 310b such that the organic light emitting diode 315 can be formed thereon. The flattening layer may be formed of a spin-on-glass (SOG) film, a polyimide polymer, or a polyacrylic polymer, without being limited thereto.

The organic light emitting diode 315 realizes a display through self-emission, and may include a first electrode 315a, an organic light-emitting layer 315b, and a second electrode 315c, which are stacked in the stated order. Adjacent organic light emitting diodes may be isolated from each other by the insulating layer 317. The organic light emitting diode 315 may have a bottom emission type structure wherein light generated from the organic light-emitting layer 315b is emitted through the lower substrate, or a top-emission type structure wherein light from the organic light-emitting layer 315b is emitted through an upper substrate.

The protective layer 318 covers the organic light emitting diodes to protect the organic light emitting diodes. The protective layer may be formed of an inorganic material such as SiOx, SiNx, SiC, SiON, SiONC, and amorphous carbon (a-C), or an organic material such as (meth)acrylates, epoxy polymers, imide polymers, and the like. Specifically, the protective layer may include an encapsulation layer in which an inorganic material layer and an organic material layer are sequentially stacked once or plural times.

Referring again to FIG. 3, the adhesive layer 360 serves to attach the display unit 350a to the polarizing plate 370, and may be formed of an adhesive composition including a (meth)acrylate resin, a curing agent, an initiator, and a silane coupling agent.

The polarizing plate 370 can realize polarization of internal light or prevent reflection of external light to realize a display, or can increase contrast of the display. The polarizing plate may be composed of a polarizer alone. Alternatively, the polarizing plate may include a polarizer and a protective film formed on one or both surfaces of the polarizer. Alternatively, the polarizing plate may include a polarizer and a protective coating layer formed on one or both surfaces of the polarizer. As the polarizer, the protective film and the protective coating layer, a typical polarizer, a typical protective film and a typical protective coating layer known in the art may be used.

The touchscreen panel 380 generates electrical signals through detection of variation in capacitance when a human body or a conductor such as a stylus touches the touchscreen panel, and the display unit 350a may be driven by such electrical signals. The touchscreen panel 380 is formed by patterning a flexible conductive conductor, and may include first sensor electrodes and second sensor electrodes each formed between the first sensor electrodes and intersecting the first sensor electrodes. The touchscreen panel 380 may include a conductive material such as metal nanowires, conductive polymers, and carbon nanotubes, without being limited thereto.

The flexible window film 390 may be disposed as an outermost layer of the flexible display 300 to protect the flexible display.

Although not shown in FIG. 3, adhesive layers may be further formed between the polarizing plate 370 and the touchscreen panel 380 and/or between the touchscreen panel 380 and the flexible window film 390 to reinforce coupling between the polarizing plate, the touchscreen panel, and the flexible window film. The adhesive layers may be formed of an adhesive composition including a (meth)acrylate resin, a curing agent, an initiator, and a silane coupling agent. Although not shown in FIG. 3, a polarizing plate may be disposed under the display unit 350a to realize polarization of internal light.

Next, a flexible display according to another embodiment of the present invention will be described with reference to FIG. 5. FIG. 5 is a sectional view of a flexible display according to another embodiment of the present invention.

Referring to FIG. 5, a flexible display 400 according to another embodiment of the invention includes a display unit 350a, a touchscreen panel 380, a polarizing plate 370, and a flexible window film 390, which may include the flexible window film according to the embodiments of the invention. The flexible display according to this embodiment is substantially the same as the flexible display according to the above embodiment except that the touchscreen panel 380 is directly formed on the display unit 350a. In addition, the touchscreen panel 380 may be formed together with the display unit 350a. In this case, since the touchscreen panel 380 is formed together with the display unit 350a on the display unit 350a, the flexible display according to this embodiment is thinner and brighter than the flexible display according to the above embodiment, thereby providing better visibility. In addition, the touchscreen panel 380 may be formed by deposition, without being limited thereto.

Although not shown in FIG. 5, adhesive layers may be further formed between the display unit 350a and the touchscreen panel 380, between the touchscreen panel 380 and the polarizing plate 370, and/or between the polarizing plate 370 and the flexible window film 390 to reinforce mechanical strength of the display. The adhesive layers may be formed of an adhesive composition including a (meth)acrylate resin, a curing agent, an initiator, and a silane coupling agent. Although not shown in FIG. 5, a polarizing plate may be disposed under the display unit 350a to realize polarization of internal light.

Next, a flexible display according to a further embodiment of the present invention will be described with reference to FIG. 6. FIG. 6 is a sectional view of a flexible display according to a further embodiment of the present invention.

Referring to FIG. 6, a flexible display 500 according to a further embodiment includes a display unit 350b, an adhesive layer 360, and a flexible window film 390, which may include the flexible window film according to the embodiments of the invention. The flexible display according to this embodiment is substantially the same as the flexible display according to the one embodiment except that the flexible display can be driven by the display unit 350b alone and the polarizing plate and the touchscreen panel are omitted.

The display unit 350a may include a substrate and an optical device formed on the substrate and including an OLED, an LED or an LCD device. The display unit 350b may further include a touchscreen panel therein.

Hereinafter, the present invention will be described in more detail with reference to some examples. It should be understood that these examples are provided for illustration only and are not to be construed in any way as limiting the present invention.

Example 1

50 g of a monomer mixture comprising 99 mol % of 2-(3,4-epoxycyclohexyl)ethyltriethoxysilane (Sigma-Aldrich) and 1 mol % of 2-hydroxy-4-(3-triethoxysillyl-propoxy)diphenylketone (Gelest) was placed in a 200 ml 2-neck flask. To the monomer mixture, 2 mol % of KOH and 1 mol % of water were added, followed by stirring at 65° C. for 4 hours. A siloxane resin was prepared by removing water and alcohol using a vacuum distillation device, and methylethylketone was added thereto to obtain 90 wt % of the siloxane resin in terms of solid content. The siloxane resin had a weight average molecular weight of 6,200 g/mol as measured by gel permeation chromatography.

A composition for window films was prepared by mixing 100 parts by weight of the prepared siloxane resin and 5 parts by weight of an initiator (Irgacure-250, BASF), and coated onto a polyethylene terephthalate film (TA043, Toyobo, thickness: 80 µm). Then, the coating was dried at 100° C. for 5 minutes, irradiated with UV light at 1,000 mJ/cm², and heated at 80° C. for 4 hours, thereby preparing a window film having a 50 µm thick coating layer.

Example 2

50 g of a monomer mixture comprising 99 mol % of 2-(3,4-epoxycyclohexyl)ethyltriethoxysilane (Sigma-Aldrich) and 1 mol % of 2-hydroxy-4-(3-triethoxysillyl-propoxy)diphenylketone (Gelest) was placed in a 200 ml 2-neck flask. To the monomer mixture, 2 mol % of KOH and 1 mol % of water were added, followed by stirring at 65° C. for 4 hours. A siloxane resin was prepared by removing water and alcohol using a vacuum distillation device, and methylethylketone was added thereto to obtain 90 wt % of the siloxane resin in terms of solid content. The siloxane resin had a weight average molecular weight of 6,200 g/mol as measured by gel permeation chromatography.

A composition for window films was prepared by mixing 100 parts by weight of the prepared siloxane resin, 10 parts by weight of a crosslinking agent (CY-179, CIBA), and 5 parts by weight of an initiator (Irgacure-250, BASF), and coated onto a polyethylene terephthalate film (TA043, Toyobo, thickness: 80 µm). Then, the coating was dried at 100° C. for 5 minutes, irradiated with UV light at 1,000 mJ/cm², and heated at 80° C. for 4 hours, thereby preparing a window film having a 50 µm thick coating layer.

Example 3

50 g of a monomer mixture comprising 95 mol % of 2-(3,4-epoxycyclohexyl)ethyltriethoxysilane (Sigma-Aldrich) and 5 mol % of 2-hydroxy-4-(3-triethoxysillyl-propoxy)diphenylketone (Gelest) was placed in a 200 ml 2-neck flask. To the monomer mixture, 2 mol % of KOH and 1 mol % of water were added, followed by stirring at 65° C. for 4 hours. A siloxane resin was prepared by removing water and alcohol using a vacuum distillation device, and methylethylketone was added thereto to obtain 90 wt % of the siloxane resin in terms of solid content. The siloxane resin had a weight average molecular weight of 6,200 g/mol as measured by gel permeation chromatography. A window film was prepared using the prepared siloxane resin in the same manner as in Example 2.

Example 4

(1) Preparation of Second Silicon Monomer 50.0 g of Tinuvin-400 (BASF) and 150 ml of toluene were mixed in a 1 L round bottom flask. After washing the mixture three times with 150 ml of distilled water per each time using a separatory funnel, an organic layer was collected, followed by vacuum enrichment and drying. The obtained concentrate was dissolved in 85 ml of tetrahydrofuran, and 17.06 g of 3-(triethoxysilyl)propylisocyanate) and 1.0 g of a 5% tetrahydrofuran solution in which dibutyltin dilaurate was dissolved were further added thereto. Reaction was performed by refluxing at 65° C. for 3 hours, followed by cooling to room temperature, and completion of the reaction was confirmed through NMR. The obtained solution was completely dried through vacuum enrichment, thereby obtaining Tinuvin-400 derived triethoxysilane, which was a second silicon monomer having a solid phase.

(2) Preparation of Window Film 50 g of a monomer mixture comprising 99 mol % of 2-(3,4-epoxycyclohexyl)ethyltriethoxysilane (Sigma-Aldrich) and 1 mol % of the second silicon monomer was placed in a 200 ml 2-neck flask. To the monomer mixture, 2 mol % of KOH and 1 mol % of water were added, followed by stirring at 65° C. for 4 hours. A siloxane resin was prepared by removing water and alcohol using a vacuum distillation device, and methylethylketone was added thereto to obtain 90 wt % of the siloxane resin in terms of solid content. The siloxane resin had a weight average molecular weight of 6,200 g/mol as measured by gel permeation chromatography. A window film was prepared using the prepared siloxane resin in the same manner as in Example 2.

Example 5

50 g of a monomer mixture comprising 95 mol % of 2-(3,4-epoxycyclohexyl)ethyltriethoxysilane (Sigma-Aldrich) and 5 mol % of the second silicon monomer was placed in a 200 ml 2-neck flask. To the monomer mixture, 2 mol % of KOH and 1 mol % of water were added, followed by stirring at 65° C. for 4 hours. A siloxane resin was prepared by removing water and alcohol using a vacuum distillation device, and methylethylketone was added thereto to obtain 90 wt % of the siloxane resin in terms of solid content. The siloxane resin had a weight average molecular weight of 6,200 g/mol as measured by gel permeation chromatography. A window film was prepared using the prepared siloxane resin in the same manner as in Example 2.

Comparative Example 1

50 g of a monomer comprising 100 mol % of 2-(3,4-epoxycyclohexyl)ethyltriethoxysilane (Sigma-Aldrich) was placed in a 200 ml 2-neck flask. To the mixture, 2 mol % of KOH and 1 mol % of water were added, followed by stirring at 65° C. for 4 hours. A siloxane resin was prepared by removing water and alcohol using a vacuum distillation device, and methylethylketone was added thereto to obtain 90 wt % of the siloxane resin in terms of solid content. The siloxane resin had a weight average molecular weight of 6,200 g/mol as measured by gel permeation chromatography.

A composition for window films was prepared by mixing 100 parts by weight of the prepared siloxane resin, 10 parts by weight of a crosslinking agent (CY-179, CIBA), 5 parts by weight of an initiator (Irgacure-250, BASF), and 1 part by weight of a UV absorbent (Tinuvin-479, BASF). The prepared composition was coated onto a polyethylene terephthalate film (TA043, Toyobo, thickness: 80 µm), dried at 100° C. for 5 minutes, irradiated with UV light at 1,000 mJ/cm², and heated at 80° C. for 4 hours, thereby preparing a window film having a 50 µm thick coating layer.

Comparative Example 2

50 g of a monomer comprising 100 mol % of 3-glycidoxypropyltriethoxysilane (Sigma-Aldrich) was placed in a 200 ml 2-neck flask. To the mixture, 2 mol % of KOH and 1 mol % of water were added, followed by stirring at 65° C. for 4 hours. A siloxane resin was prepared by removing water and alcohol using a vacuum distillation device, and methylethylketone was added thereto to obtain 90 wt % of the siloxane resin in terms of solid content. The siloxane resin had a weight average molecular weight of 6,200 g/mol as measured by gel permeation chromatography. A window film was prepared using the prepared siloxane resin in the same manner as in Comparative Example 1.

Comparative Example 3

50 g of a monomer mixture comprising 5 mol % of 2-(3,4-epoxycyclohexyl)ethyltriethoxysilane (Sigma-Aldrich) and 95 mol % of methyltrimethoxysilane (Gelest) was placed in a 200 ml 2-neck flask. To the monomer mixture, 2 mol % of KOH and 1 mol % of water were added, followed by stirring at 65° C. for 4 hours. A siloxane resin was prepared by removing water and alcohol using a vacuum distillation device, and methylethylketone was added thereto to obtain 90 wt % of the siloxane resin in terms of solid content. The siloxane resin had a weight average molecular weight of 6,200 g/mol as measured by gel permeation chromatography. A window film was prepared using the prepared siloxane resin in the same manner as in Comparative Example 1.

Details of the compositions for window films prepared in Examples and Comparative Examples are shown in Table 1. The window films prepared in Examples and Comparative Examples were evaluated as to Properties 1 to 3 and evaluation results are shown in Table 1.

1. Pencil hardness: Pencil hardness was measured on a coating layer of a window film using a pencil hardness tester (Heidon) in accordance with JIS K5400. Pencil hardness was measured using pencils of 6B to 9H (Mitsubishi Co., Ltd.) under conditions of a pencil load of 1 kg on the coating layer, a scratch angle of 45°, and a scratch speed of 60 mm/min. When the coating layer had one or more scratches after being tested 5 times using a certain pencil, pencil hardness was measured again using another pencil having one-level lower pencil hardness than the previous pencil. A pencil hardness value allowing no scratch to be observed all five times on the coating layer was taken as pencil hardness of the coating layer.

2. Radius of curvature: A window film (thickness×width×length, 3 cm×15 cm×150 μm, base layer thickness: 80 μm, coating layer thickness: 50 μm) was wound around a jig for measuring a radius of curvature, kept wound for 5 seconds or more, unwound, and then observed with the naked eye to determine whether the window film had cracks. Here, a radius of curvature in a compressive direction was measured by winding the window film around the jig such that the coating layer of the window film contacted the jig, and a radius of curvature in a tensile direction was measured by winding the window film around the jig such that the base layer of the window film contacted the jig. The radius of curvature was determined as a minimum radius of a jig causing no crack on the window film, as measured in the compression direction while gradually decreasing the diameters of jigs from a jig having the maximum diameter.

3. Light resistance: A yellow index (Y1) was measured on a window film under a D65 light source at 2° (angle between the window film and the light source) using a colorimeter (CM-3600D, Konica Minolta). Then, a yellow index (Y2) was measured on the window film by the same method after irradiating the window film at a peak wavelength of 306 nm for 72 hours using a weather resistance tester (Xe-1, Q-SUN). Light resistance was determined based on a difference in yellow index (Y2-Y1, ΔY.I.) between before and after irradiation.

TABLE 1

| | | Example 1 | Example 2 | Example 3 | Example 4 | Example 5 | Comparative Example 1 | Comparative Example 2 | Comparative Example 3 |
|---|---|---|---|---|---|---|---|---|---|
| Silicon monomer (mol %) | 2-(3,4-epoxycyclohexyl)ethyltriethoxy silane | 99 | 99 | 95 | 99 | 95 | 100 | — | 5 |
| | 2-hydroxy-4-(3-triethoxysillylpropoxy)diphenylketone | 1 | 1 | 5 | — | — | — | — | — |
| | Tinuvin-400 derived triethoxysilane | — | — | — | 1 | 5 | — | — | — |
| | Methyltrimethoxysilane | — | — | — | — | — | — | — | 95 |
| | 3-glycidoxypropyltriethoxysilane | — | — | — | — | — | — | 100 | — |
| Crosslinking agent (parts by weight) | | — | 10 | 10 | 10 | 10 | 10 | 10 | 10 |
| Initiator (parts by weight) | | 5 | 5 | 5 | 5 | 5 | 5 | 5 | 5 |
| UV absorbent (parts by weight) | | — | — | — | — | — | 1 | 1 | 1 |
| Pencil hardness | | 7H | 8H | 7H | 8H | 7H | 7H | 6H | 4H |
| Radius of curvature (mm) | | 4.2 | 3.6 | 3.7 | 3.4 | 3.6 | 5.9 | 4.6 | 8.6 |
| Light resistance | | 2.0 | 2.3 | 2.1 | 2.3 | 2.2 | 3.8 | 5.2 | 3.9 |

As shown in Table 1, the flexible window films according to the present invention had a high pencil hardness value of 7H or more, good flexibility with a radius of curvature of 5.0 mm or less and good light resistance, and thus can be used as a flexible window film.

Conversely, as shown in Table 1, the window films of Comparative Examples 1 to 3, which did not include the composition free from the siloxane resin comprising the compound represented by Formula 1, exhibited poorer property in terms of at least one of pencil hardness, radius of curvature and light resistance than the window films according to the present invention.

It should be understood that various modifications, changes, alterations, and equivalent embodiments can be made by those skilled in the art without departing from the spirit and scope of the invention.

The invention claimed is:
1. A composition for window films, comprising: a siloxane resin comprising a compound represented by Formula 1; and an initiator:

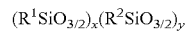  <Formula 1> wherein $R^1$ is a crosslinkable functional group; $R^2$ is a UV absorption functional group or a UV absorption functional group-containing group; and $0 < x < 1$, $0 < y < 1$, and $x+y=1$, and wherein R² comprises a group selected from an unsubstituted or substituted benzotriazole group, an unsubstituted or substituted benzophenone group, an unsubstituted or substituted hydroxybenzophenone group, an unsubstituted or substituted triazine group, an unsubstituted or substituted salicylate group, an unsubstituted or substituted cyanoacrylate group, an unsubstituted or substituted oxanilide group, an unsubstituted or substituted hydroxyphenyltriazine group, an unsubstituted or substituted hydroxyphenylbenzotriazole group, and an unsubstituted or substituted hydroxyphenylbenzophenone group.

2. The composition for window films according to claim 1, wherein the siloxane resin comprises at least one of compounds represented by Formulae 1-1 to 1-12:

$(EcSiO_{3/2})_x(RaSiO_{3/2})_y$ <Formula 1-1>

$(EcSiO_{3/2})_x(RbSiO_{3/2})_y$ <Formula 1-2>

$(ECSiO_{3/2})_x(RCSiO_{3/2})_y$ <Formula 1-3>

$(EcSiO_{3/2})_x(RdSiO_{3/2})_y$ <Formula 1-4>

$(GpSiO_{3/2})_x(RaSiO_{3/2})_y$ <Formula 1-5>

$(GpSiO_{3/2})_x(RbSiO_{3/2})_y$ <Formula 1-6>

$(GpSiO_{3/2})_x(RCSiO_{3/2})_y$ <Formula 1-7>

$(GpSiO_{3/2})_x(RdSiO_{3/2})_y$ <Formula 1-8>

$(OpSiO_{3/2})_x(RaSiO_{3/2})_y$ <Formula 1-9>

$(OpSiO_{3/2})_x(RbSiO_{3/2})_y$ <Formula 1-10>

$(OpSiO_{3/2})_x(RCSiO_{3/2})_y$ <Formula 1-11>

$(OpSiO_{3/2})_x(RdSiO_{3/2})_y$ <Formula 1-12> wherein Ec is a (3,4-epoxycyclohexyl)ethyl group, Gp is a 3-glycidoxypropyl group, Op is a 3-oxetanylpropyl group, and Ra is a compound represented by Formula i, Rb is a compound represented by Formula ii, Rc is a compound represented by Formula iii, and Rd is a compound represented by Formula iv:

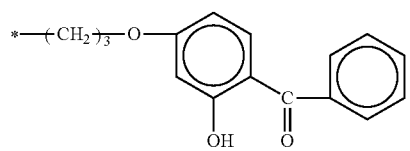

<Formula i>

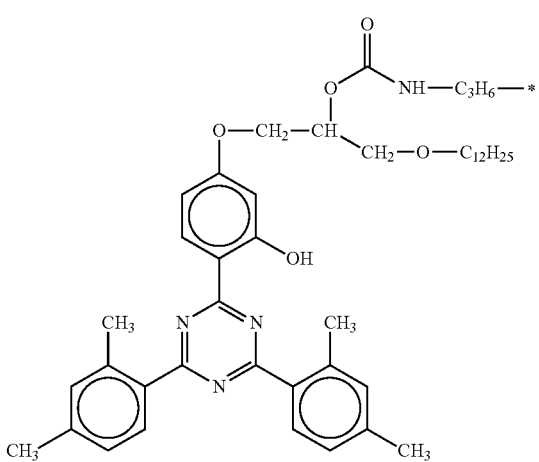

<Formula ii>

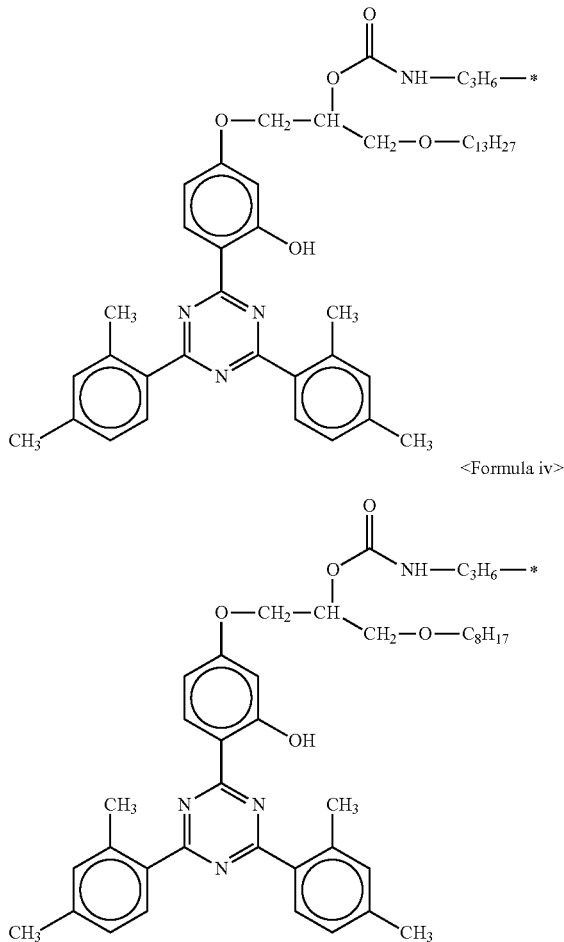

<Formula iii>

<Formula iv> wherein * is a linking site, 0<x<1, 0<y<1, and x+y=1.

3. The composition for window films according to claim 1, further comprising: a crosslinking agent.

4. The composition for window films according to claim 3, wherein the crosslinking agent comprises at least one of a non-cyclic aliphatic epoxy monomer, a cyclic aliphatic epoxy monomer, an aromatic epoxy monomer, a hydrogenated aromatic epoxy monomer, and an oxetane monomer.

5. A flexible window film comprising:
a base layer, and
a coating layer formed on one surface of the base layer, the coating layer formed of a composition for window films, the composition comprising: a siloxane resin comprising a compound represented by Formula 1; and an initiator:

$(R^1SiO_{3/2})_x(R^2SiO_{3/2})_y$ <Formula 1> wherein R¹ is a crosslinkable functional group;
R² is a UV absorption functional group or a UV absorption functional group-containing group; and
0<x<1, 0<y<1, and x+y=1.

6. The flexible window film according to claim 5, further comprising: an adhesive layer formed on the other surface of the base layer.

7. The flexible window film according to claim 5, wherein the flexible window film has a pencil hardness of 7H or higher, a radius of curvature of 5.0 mm or less, and ΔY.I. of 5.0 or less.

8. A flexible display comprising a flexible window film, the flexible window film comprising:
a base layer, and
a coating layer formed on one surface of the base layer, the coating layer formed of a composition for window films, the composition comprising: a siloxane resin comprising a compound represented by Formula 1; and an initiator:

$$(R^1SiO_{3/2})_x(R^2SiO_{3/2})_y \quad \text{<Formula 1>}$$

wherein in Formula 1, $R^1$ is a crosslinkable functional group;
$R^2$ is a UV absorption functional group or a UV absorption functional group-containing group; and
$0<x<1$, $0<y<1$, and $x+y=1$.

9. The flexible display according to claim 8, comprising: a display unit; an adhesive layer formed on the display unit; a polarizing plate formed on the adhesive layer; a touchscreen panel formed on the polarizing plate; and the flexible display film formed on the touchscreen panel.

10. The flexible display according to claim 8, comprising: a display unit; a touchscreen panel formed on the display unit; a polarizing plate formed on the touchscreen panel; and the flexible display film formed on the polarizing plate.

11. The flexible display according to claim 8, comprising: a display unit; an adhesive layer formed on the display unit; and the flexible window film formed on the adhesive layer.

12. The flexible display according to claim 11, wherein the display unit further comprises a polarizing plate disposed at an upper or lower side thereof.

* * * * *